Figure 1:
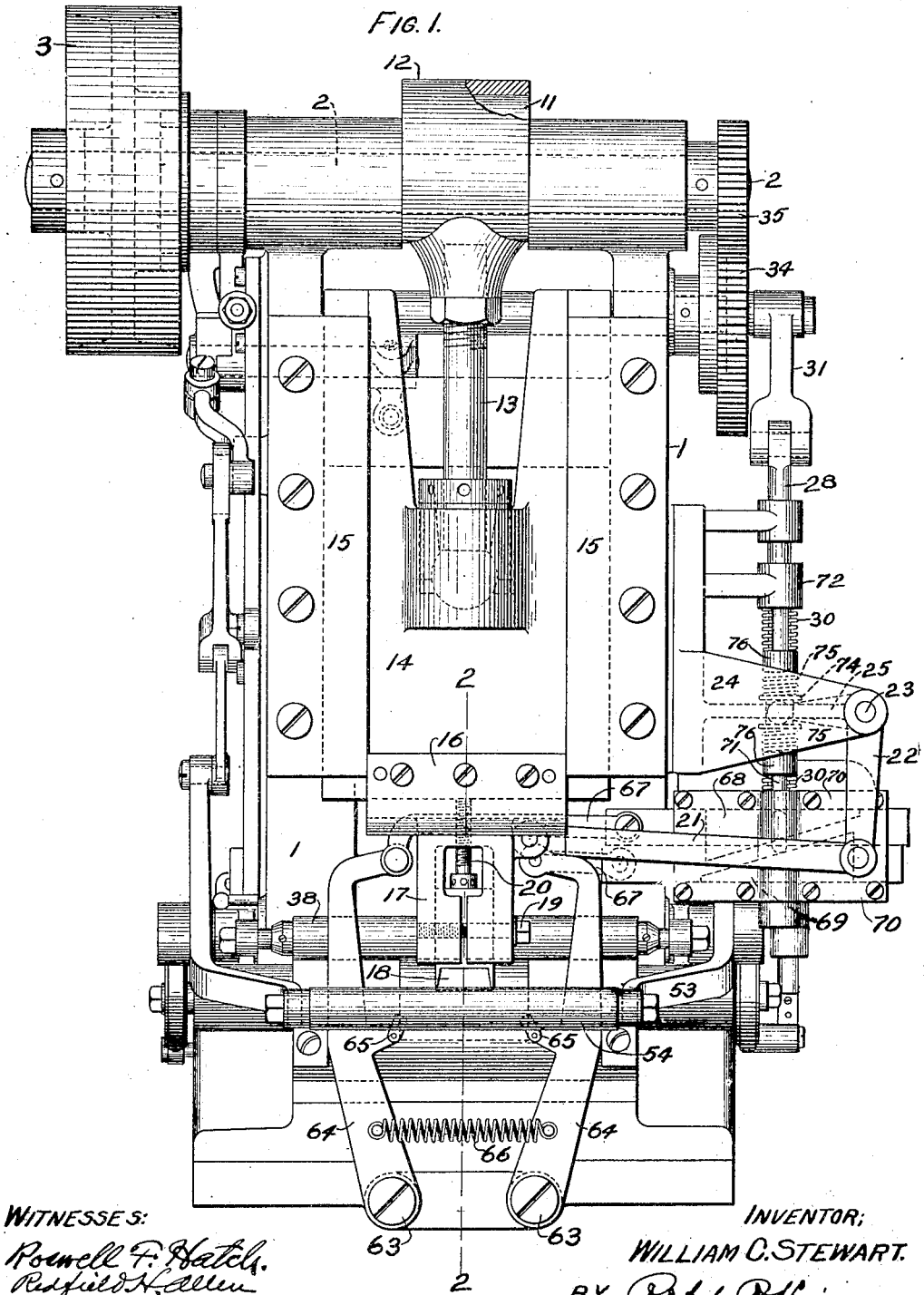

No. 871,969.

PATENTED NOV. 26, 1907.

W. C. STEWART.
SOLE SLASHING MACHINE.
APPLICATION FILED JUNE 28, 1907.

2 SHEETS—SHEET 1.

WITNESSES:
Powell F. Hatch.
Redfield H. Allen.

INVENTOR:
WILLIAM C. STEWART.
BY Robt. P. Hains.
ATTY.

No. 871,969. PATENTED NOV. 26, 1907.
W. C. STEWART.
SOLE SLASHING MACHINE.
APPLICATION FILED JUNE 28, 1907.
2 SHEETS—SHEET 2.
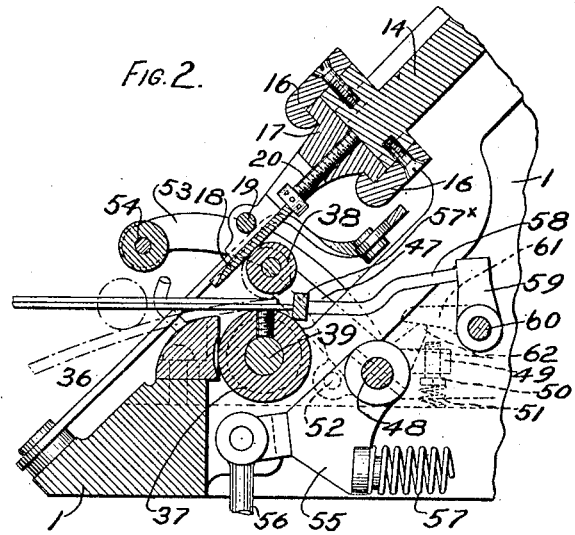
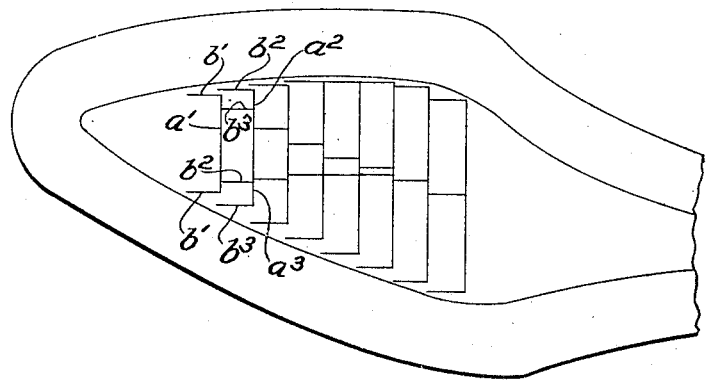
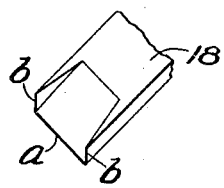
WITNESSES:
Roswell F. Hatch.
Redfield H. Allen
INVENTOR:
WILLIAM C. STEWART.
BY Robt. P. Haines,
ATTY.

UNITED STATES PATENT OFFICE.

WILLIAM C. STEWART, OF LYNN, MASSACHUSETTS, ASSIGNOR TO MANUFACTURERS MACHINE COMPANY, OF MONTCLAIR, NEW JERSEY, A CORPORATION OF NEW JERSEY.

SOLE-SLASHING MACHINE.

No. 871,969.     Specification of Letters Patent.     Patented Nov. 26, 1907.

Application filed June 28, 1907. Serial No. 381,194.

*To all whom it may concern:*

Be it known that I, WILLIAM C. STEWART, a subject of the King of Great Britain, and a resident of Lynn, county of Essex, State of Massachusetts, have invented an Improvement in Insole-Slashing Machines, of which the following description, in connection with the accompanying drawings, is a specification, like letters on the drawings representing like parts.

The invention to be hereinafter described relates to machines for slashing insoles of boots and shoes and is more particularly directed to certain improvements on the machine of my application Ser. No. 316,102, filed May 10, 1906.

By the machine of my said application the sole treated thereby was provided with a series of substantially transverse slashes, and while these served to secure a desired flexibility of the sole, I have found that increased flexibility might be attained by also providing slashes in the sole at an angle to the transverse slashes, as will hereinafter more fully appear.

The object of the present invention, therefore, is to so improve the machine of my prior application that in addition to the results attained thereby, it will produce slashes in the work at an angle to and intersecting transverse slashes.

The invention will best be understood from the following description taken in connection with the accompanying drawings, wherein, as one embodiment of the invention, I have selected for illustrative purposes the form and general organization of the machine of my prior application to which reference may be had.

In the drawings:—Figure 1 is a face or front view of a machine embodying the present invention, said figure being substantially the same as Fig. 1, of my prior application with my present improvements added thereto. Fig. 2 is a central sectional detail on the line 2—2, Fig. 1. Fig. 3 is a diagrammatic face view of a form of insole illustrating the manner of slashing the same by the present invention. Fig. 4 is a detail perspective view of one form of slashing means or knife detached.

In the particular embodiment of the present invention selected for illustration, the frame 1 is shown as comprising a suitable bed piece having upwardly extending side members in the upper portions of which is journaled the main shaft 2, provided with a driving pulley 3 from which said main shaft may be driven as pointed out in my application Ser. No. 316,102 or otherwise, as desired.

Between the bearings of the main shaft 2, is an eccentric 11, Fig. 1, embraced by an eccentric strap 12, adjustably connected by a rod 13, with a slide 14, mounted in suitable guides or ways 15 of the main frame, whereby rotation of the shaft will cause reciprocation of the slide.

It will be noticed in Fig. 1 that the rod 13 is connected to the slide 14 by a ball and socket joint, so that the rod 13 can be screwed into the strap 12, and adjusted to any degree of nicety by partial rotation, as will be obvious.

The slide 14 at its lower portion is provided top and bottom, Fig. 2, with flanged guide plates 16, between which is mounted to slide transversely a knife carrier 17. This knife carrier 17, see Fig. 1, presents two downwardly extended arms, which embrace between them the knife 18. The edges of the knife 18 are engaged by grooves in the carrier arms, the latter being provided with a draw screw 19 by which they may be drawn to clamp between them the knife 18, in any position of adjustment.

To facilitate nice adjustment of the knife 18, the latter is supported at its upper end by a set screw 20, which, when the knife is released by slackening the screw 19, may be turned more or less to force said knife forward, or to permit it to be pushed inward as may be desired, after which it is clamped by the screw 19. Obviously reciprocation of the slide 14, will cause corresponding reciprocation of the knife 18, imparting to the latter what may be termed a chopping or slashing action.

In the machine of my prior application it will be noted that slashes were made in the material of the insole extending generally in a transverse direction thereof. In the present invention, however, it is desired to produce on the sole tongue portions, so called, wherein terminal parts shall be free from or non-integral with the material of the sole, thereby securing increased flexibility, as will be readily understood. As one expedient for securing this result the present invention comprehends provisions for providing the sole with substantially transverse slashes and other slashes disposed at an angle thereto adjacent terminal portions of said transverse slashes, as will hereinafter more fully appear.

One means for carrying this feature of the invention into effect is shown in Fig. 4, wherein the knife or cutter 18 is shown provided with a cutting edge $a$ to produce a substantially transverse slash in the material of the sole, said cutting edge $a$ being flanked by angular or outturned cutting portions $b$ $b$ which enter the material of the sole at terminal portions of the slashes produced by the edge $a$, and form slits or slashes at an angle to and intersecting the transverse slashes, the general disposition of the slashes being diagrammatically shown at $a'$, $b'$, Fig. 3. In said figure the transverse portion $a'$ represents the slash made by the cutting edge $a$, and $b'$, $b'$, represent the substantially longitudinal slashes made at terminal portions of the slashes $a'$, thereby producing tongues upon the sole, as more fully explained in my prior application Ser. No. 344,526, filed, Nov. 22, 1906, wherein the slashed sole produced by the machine of the present application is broadly claimed.

It will be fully understood by those skilled in the art that the form of the knife 18 and the relation of its cutting edges may be varied, the essential with respect thereto being that it shall produce intersecting slashes or form on the sole tongues, whereof terminal portions shall be free from the material of the sole to permit increased flexibility.

The knife 18 is of a selected width and regardless of the particular formation of the cutting edge $a$ and $b$, will make a cut of a certain length, which, for the best results, should be equal to the shortest cut to be made in the insole. As the cuts or slashes progress towards the ball part of the sole, obviously they should progress in length to keep pace with the widening sole, and to accomplish this with a knife of fixed width, my invention contemplates making a plurality of, and preferably two, cuts with the knife for each feed step of the sole, the first cut being made adjacent one edge of the sole and extending inward more or less across the sole, and then, as the knife is withdrawn, it is moved endwise or across the sole into a corresponding position relative to the opposite edge of the sole and given a second cutting movement. The two successive cuts may, of course, overlap more or less according to the relative length of knife and width of sole; thus at the narrower portions of the sole the two cuts may be superposed one upon the other, while at the wider portions of the sole the successive cuts may extend in substantial transverse prolongation of each other. This is illustrated in Fig. 3, wherein the two cuts of the knife to produce the slash nearest the toe are indicated by the single set of lines $a'$, $b'$, $b'$; in other words the two cuts at this point of the sole may be made in the same place. The next pair of cuts is represented by the lines $a^2$, $b^2$, $b^2$; and $a^3$, $b^3$, $b^3$, respectively, the cuts $a^2$ and $a^3$ extending transversely of the sole in substantial prolongation of each other, and the cuts $b^2$ and $b^3$ intersecting the transverse cuts as shown. It is evident, therefore, that for every step feed of the sole there must be two downward or chopping strokes of the cutter, and that between downward strokes of the cutter the latter is moved endwise across the sole from one to the opposite side thereof, this endwise movement being obtained by sliding the knife carrier in its transverse guides 16, on the reciprocal head or slide 14. To accomplish this I have connected to the said knife carrier at one side a connecting rod 21, jointed at its outer end to a depending arm of a bell-crank lever 22, fulcrumed at 23, in a bracket 24, on one of the frame side members. This bell-crank lever through its arm 25, and adjunctive parts is actuated from the main shaft 2, through the gearing 34, 35, connecting rod 31, and slide rod 28 as fully explained in my prior application Ser. No. 316,102 and which need not therefore be herein described in more detail, except to say that the gear wheel 34 is driven by the gear 35, at one half speed of the main shaft.

From the foregoing it will appear that reciprocation of the slide rod 28, through its springs 30, and connected parts will rock the bell-crank 22, and impart transverse reciprocation to the knife carrier and its knife in the reciprocating slide 14, so that the said knife has a combined up and down or chopping movement and also an endwise sliding movement to produce a cut, when necessary, that is longer than the width of the knife itself, substantially in all respects as pointed out in my application above referred to.

Referring particularly to Fig. 2, the bed of the frame is provided with an anvil 36, presenting an outer curved face over which the sole to be slashed may be drawn, as indicated in dotted lines, (Fig. 2).

Immediately behind the anvil 36, is the feed roller 37, and above it the presser roller 38. The feed roller which preferably is of metal with a corrugated or roughened surface, but which may have a rubber or other yielding surface, if desired, is fast upon a shaft 39, journaled in the frame which may be given a step-by-step movement by any suitable or appropriate means such as that pointed out in my application Ser. No. 316,102 hereinbefore referred to.

The presser roller 38, Fig. 2, is loosely mounted in a pair of arms 47, loosely mounted upon the shaft 48, journaled in the side frame members. These arms 47, are provided respectively with rearwardly extended knife portions 49, provided with adjusting screws 50, which are acted upon by presser springs 51, seated in the frame, and which tend to throw the presser roller 38, normally downward into contact with the sole resting upon the feed roll 37. This downward spring actuated movement of the presser roller is normally restrained and controlled by contact with two pins 52, carried in a pair of arms 53, that are fast on said shaft 48, and carry at their outer ends a flexing or bending roller 54. The said shaft 48 is provided with a treadle arm 55, connected by a rod 56, with a suitable treadle (not shown), and is provided with a return spring 57, acting in opposition to the treadle, said spring 57 being of sufficient strength to overcome the presser springs 51, and normally compress the latter to hold both the flexing roller 54, and the presser roller 38, normally in their elevated position.

In the rear of and between the presser and feed rollers stands a feeding stop 57×, on a rod 58, adjustably mounted in an arm 59, on a shaft 60, mounted in the machine frame. This shaft is provided with a second horizontally extended arm 61, that overlies an ear 62, on one of the flexer arms 53. All of which is fully explained in my prior application referred to.

The sole to be slashed is inserted over the anvil beneath the knife 18, and between the feed and presser rollers with its end abutting against the stop 57×. The operator now depresses the treadle and brings the presser and flexing rollers down upon the sole. The presser roller 38, first contacts with the sole and there rests under the action of its spring 51, so as first to grip the sole and hold its leading end accurately in position. Further movement of the treadle brings the flexing roller 54, down upon the sole to bend or flex the latter over and upon the curved face of the anvil 36, so that that portion of the sole which is to receive the slash or cut of the knife is bent into convex form with its top face under tension and calculated to receive a slash with the least effort and with the cleanest cut by the slashing means. As the flexing roller 54, is advanced its ear 62, rises under the arm 61, of the abutting stop 57×, and lifts said stop into a position above the level of the sole so as not to interfere with the feed of the latter between the rollers. If now the main shaft 2, be given motion it will cause the slashing knife to reciprocate rapidly to make a series of slashes in the insole as the latter is fed step-by-step between the feed and presser rollers, the machine being timed up so that each slash cut takes place during a period of rest between successive feeds of the sole, and said knife, as stated, is given a transverse or endwise movement between successive downward cutting movements, all as fully set forth in my application 316,102.

It is well understood by those skilled in the art that the areas to be slashed are rarely alike, either in shape or extent, and therefore in the present machine as in that of my prior application I provide means whereby to control from the work itself the area to be slashed. To accomplish this, see Fig. 1, I have pivoted to the front edge of the bed at 63, two feeler arms 64, and intermediate their ends they are provided with inwardly and upwardly extending contact ears 65, adapted to press against and follow the outline or periphery of the sole edge fed between them. Said feelers are drawn normally towards each other by a connecting spring 66. Obviously, as a sole is fed between these feelers they will gradually spread or contract and follow the shape of the sole contour. To communicate this telltale or measuring action to the cutter for determining the transverse reciprocations of the latter, and consequently the part of the sole which will be slashed thereby, I have connected the upper ends of the said feelers 64, by links 67, with two oppositely tapering wedge shaped slides 68 and 69, mounted to slide in suitable bearings 70, on the frame. Obviously as these feelers are spread by increasing width of the sole the opposite movements of the wedge slides 68, 69, will cause the inclined or wedge faces to be effectively separated, and conversely as these feelers approach to indicate a narrowing sole, the opposite return movements of said wedge slides will effectively contract the space between their beveled or inclined faces. It is likewise true that if one sole edge were straight and the other one were curved, or if one presented less curvature than the other, in each case the wedge slides for the respective sole edges would, by their positions, correctly indicate the shape of the sole being fed through the machine.

As more fully shown in my prior application referred to, there is a stop rod 71, playing transversely, see Fig. 1, between the inclined faces of the slides 68, 69, and this stop rod is extended substantially parallel with the slide rod 28 and is mounted at one of its ends in bearings 72, and at its opposite end in a cap covering the wedge slide 69. Loosely mounted on this stop rod is a flanged sleeve 74 centered between springs 75, seated against collars 76, fast on said stop rod 71. The spring centered collar 74, is embraced by the forked end of an arm connected to the bell-crank 22. From this it will be clear that the oscillations of the bell-crank which reciprocate the knife transversely are limited by the play of the stop rod 71 between the wedge slides 68, 69, and that the separation of said slides determines the length of the transverse reciprocations of the knife which may vary from time to time according to the shape of the sole. Thus, as pointed out in my application referred to, the transverse reciprocations of the knife 18, are controlled and determined by the feelers 64 and their connected devices and a slashed area produced upon the sole.

From the construction hereinbefore described it will be obvious that upon presentation of a shoe sole in the manner stated, the knife 18, having its substantially transverse and longitudinal cutting edges *a* and *b*, will form successive cuts transversely of the sole in prolongation of each other and will at the same time, form cuts at an angle thereto to produce tongue portions having free terminal parts. It is obvious also that the transverse cuts may be disposed in various relations with each other and in connection with the substantially longitudinal cuts produce a slashed area of desired extent and contour.

What I claim is:—

1. A sole slashing machine comprising in combination transverse and longitudinal slashing means, and actuating means therefor to produce a series of slashes, one of said series comprising slashes of varying lengths.

2. A sole slashing machine comprising in combination slashing means having provision for forming substantially transverse and longitudinal cuts in a sole, and actuating means therefor to produce a slashed area on the surface of a sole and means to vary the position of the transverse cuts.

3. A sole slashing machine comprising in combination slashing means having cutting edges disposed at an angle to each other to form substantially transverse and longitudinal slashes, and actuating means therefor to produce a slashed area of such slashes on the surface of a sole.

4. A sole slashing machine comprising in combination slashing means arranged to form a slashed area on the surface of a sole and having provisions for forming cuts at an angle to each other, and means to cause the slashing means to act upon the work in a plurality of positions for making a slash in one direction.

5. A sole slashing machine comprising in combination slashing means constructed and arranged to form substantially transverse and longitudinal cuts in the surface of a sole, and means for causing the slashing means to act upon the work in different positions transversely of the work in varying the transverse position of said transverse and longitudinal cuts.

6. In a slashing machine, the combination of slashing means constructed and arranged to form cuts in the surface of a sole at an angle to each other, and means for causing the slashing means to act alternatively at different distances from an edge of the work.

7. A slashing machine comprising in combination, slashing means having provisions for forming cuts in the surface of a shoe sole at an angle to each other, and work governed means to vary the slashed area of the work.

8. A slashing machine comprising in combination slashing means constructed and arranged to form cuts in the surface of a sole at an angle to each other, and automatic slash-positioning means to vary the location of slashes to produce a slashed area on the work being treated.

9. A slashing machine comprising, in combination, slashing means constructed and arranged to form intersecting cuts in the surface of the work, and means coöperating with the work to determine the length of a slash by reference to a dimension of the work.

10. A sole slashing machine comprising, in combination, a knife having substantially transverse and substantially longitudinal cutting edges, and actuating means therefor to produce a slashed area comprising tongues on the surface of a shoe sole and means for varying the contour of such slashed area.

11. In a sole-slashing machine, the combination of a knife having substantially transverse and longitudinal cutting edges, means for reciprocating said knife, and means for changing its path of reciprocation transversely of the work.

In testimony whereof, I have signed my name to this specification, in the presence of two subscribing witnesses.

WILLIAM C. STEWART.

Witnesses:
JOHN J. HEYS,
REDFIELD H. ALLEN.